United States Patent [19]
Phillips

[11] Patent Number: 5,323,195
[45] Date of Patent: Jun. 21, 1994

[54] APPARATUS FOR SUPPORTING A CAMERA

[76] Inventor: Stephan D. Phillips, P.O. Box 1979, Martinez, Calif. 94553

[21] Appl. No.: 139,002

[22] Filed: Oct. 21, 1993

[51] Int. Cl.⁵ ............................................. G03B 29/00
[52] U.S. Cl. ....................................................... 354/82
[58] Field of Search ...................... 354/81, 82, 293, 294

[56]  References Cited
U.S. PATENT DOCUMENTS

| | | | |
|---|---|---|---|
| Re. 32,213 | 7/1986 | Brown | 354/82 X |
| 2,007,215 | 7/1935 | Remey | 248/694 |
| 4,208,028 | 6/1980 | Brown et al. | 354/82 X |
| 4,474,439 | 10/1984 | Brown | 354/293 X |
| 4,946,272 | 8/1990 | Brown | 354/82 X |
| 5,121,147 | 6/1992 | Wada et al. | 354/81 |

Primary Examiner—Howard B. Blankenship
Attorney, Agent, or Firm—Thomas R. Lampe

[57] ABSTRACT

Apparatus for supporting a camera includes an elongated support member having an elongated hollow interior for receiving the forearm of a person using the apparatus. A stabilizing strap extends from the elongated support member about the neck of the user of the apparatus. Mounts are provided for mounting a camera and related equipment such as a video monitor on the elongated support member and the user can grasp a handle in the hollow interior of the elongated support member to resist relative movement between the elongated support member and the user's forearm.

18 Claims, 7 Drawing Sheets

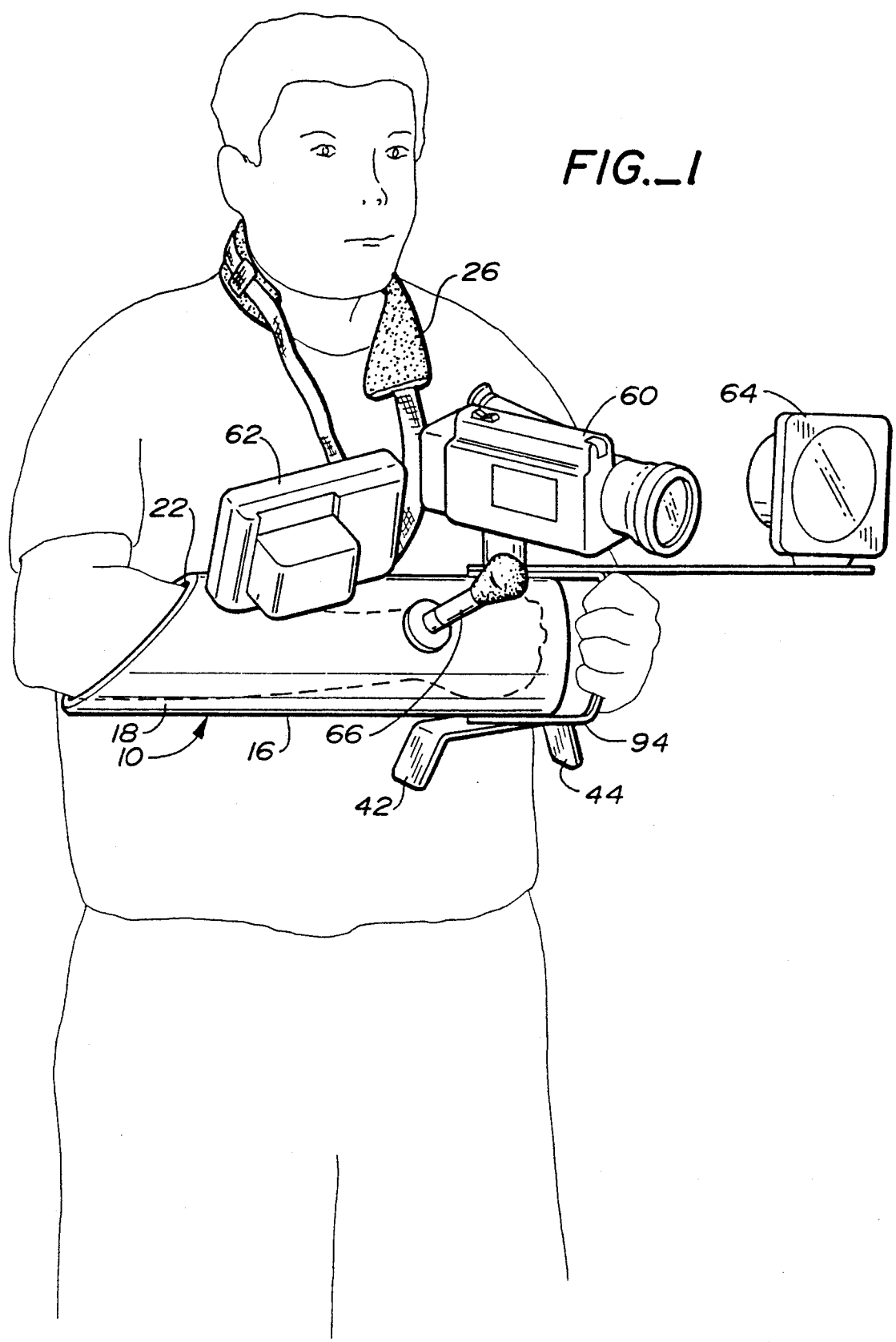
FIG._1

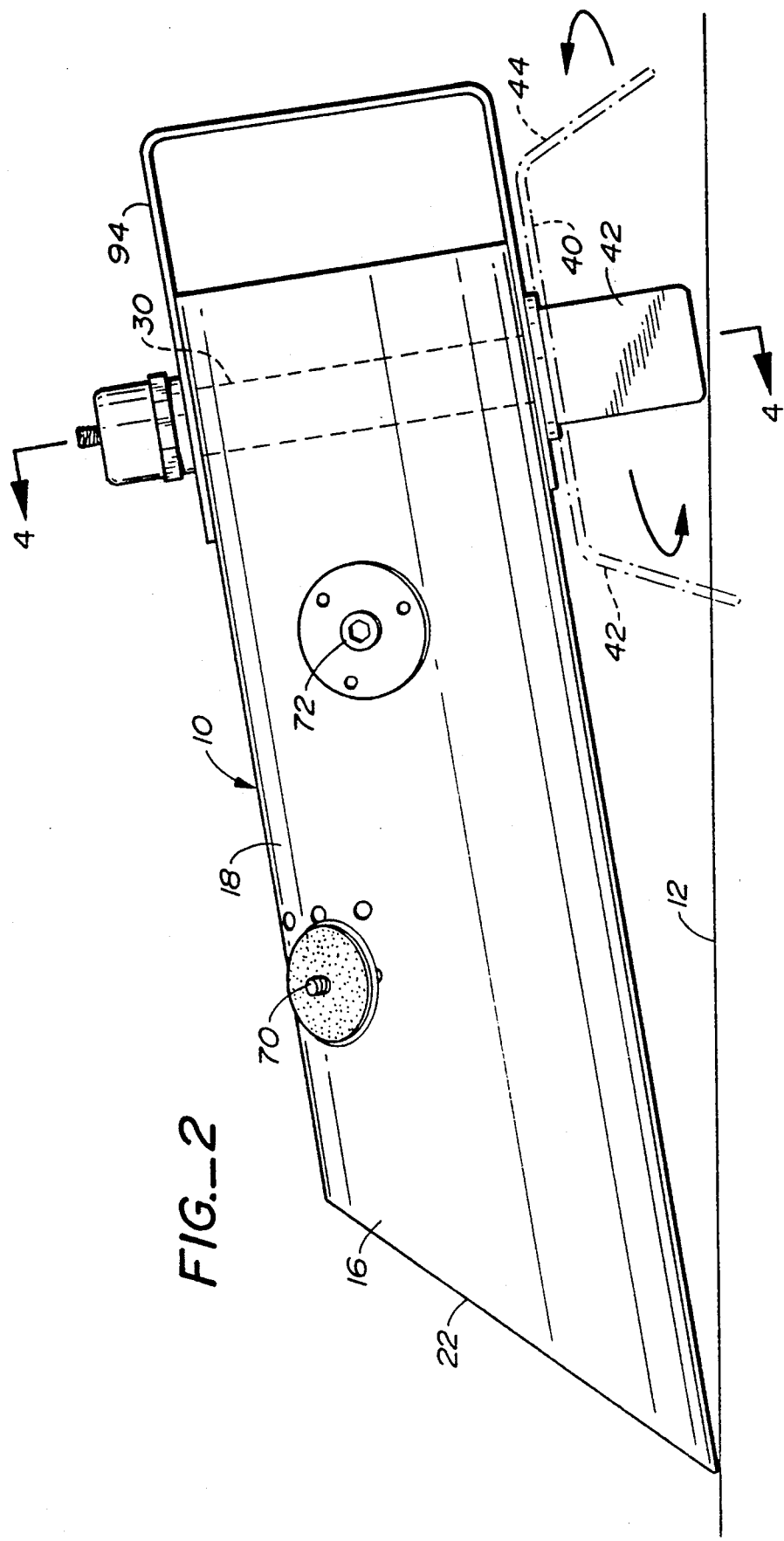
FIG._2

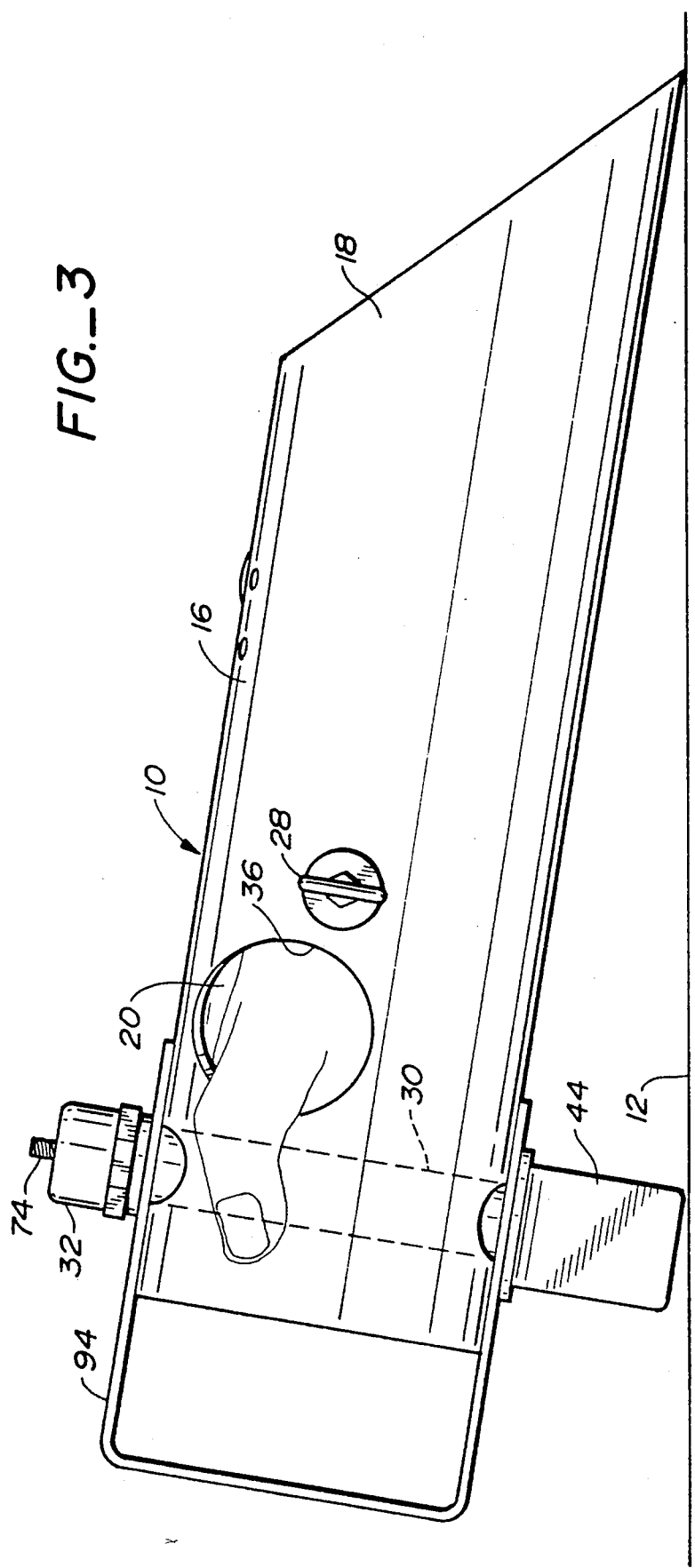

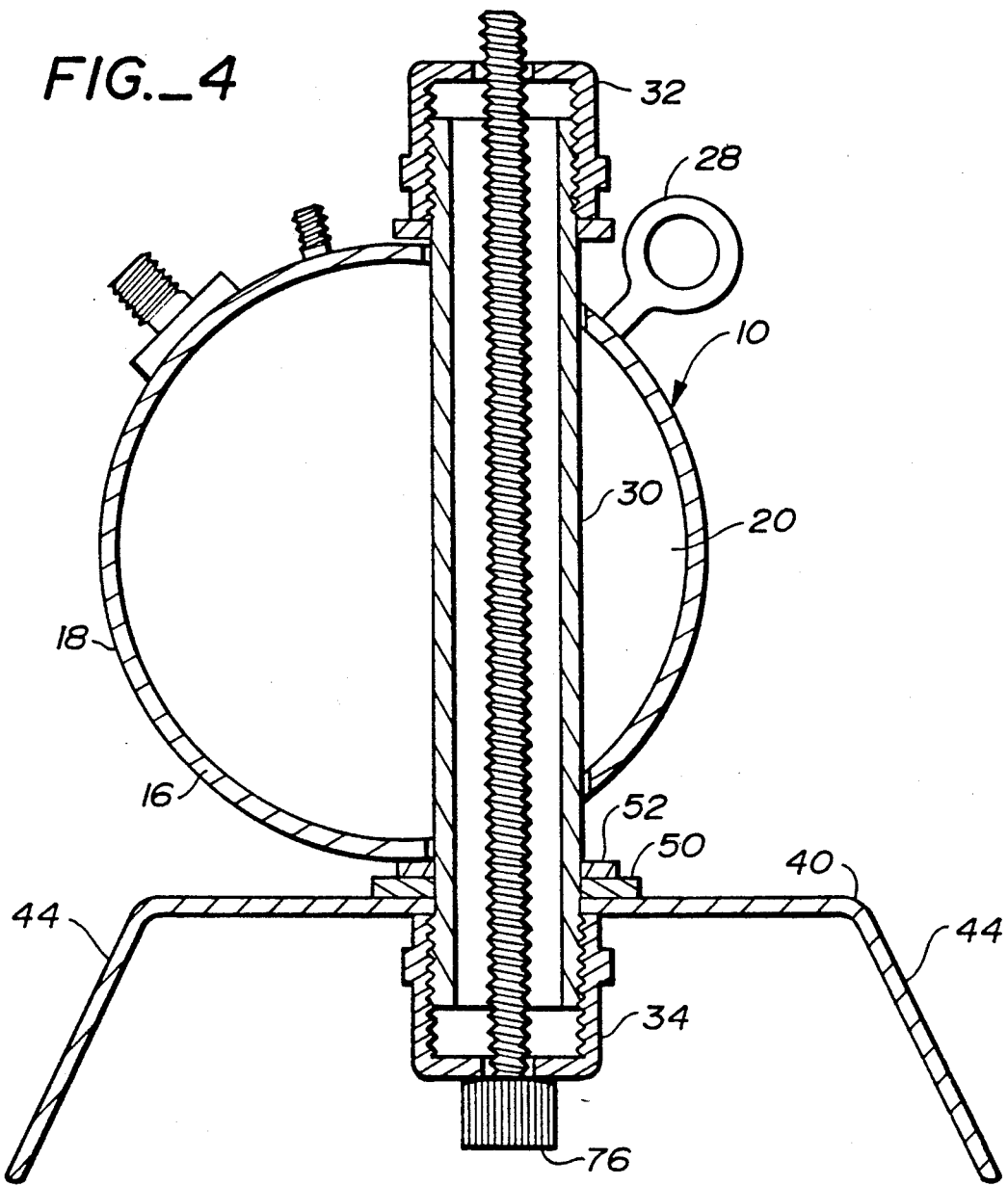

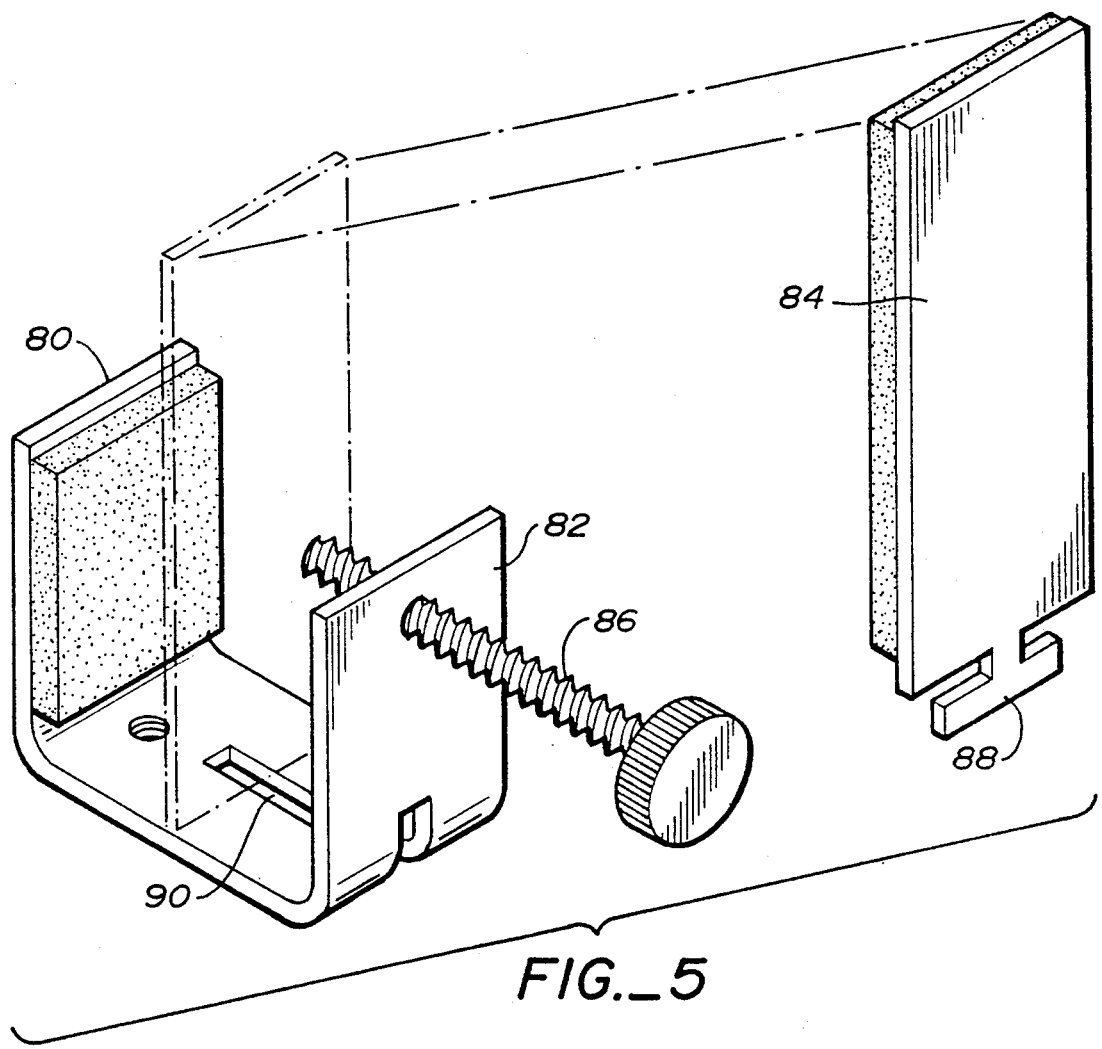
FIG._5

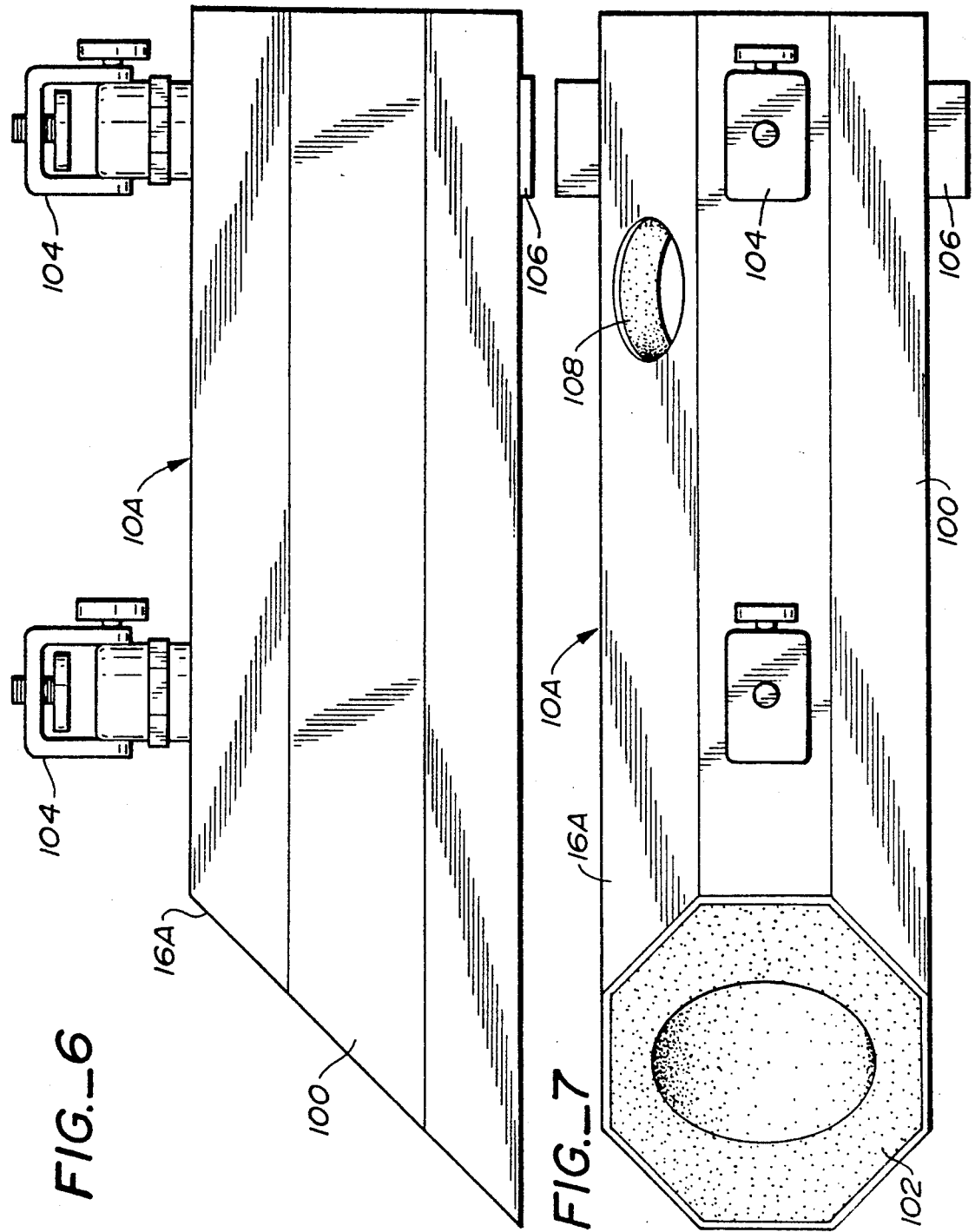

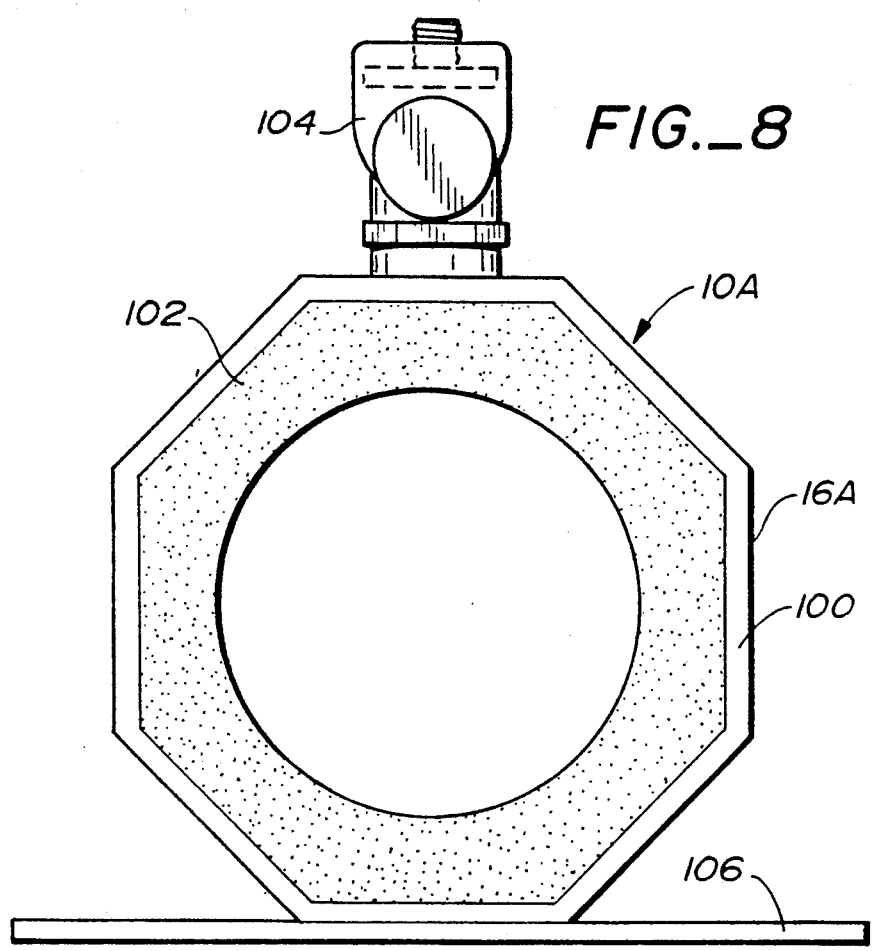

APPARATUS FOR SUPPORTING A CAMERA

TECHNICAL FIELD

This invention relates to cameras and accessories for cameras, more particularly, to portable apparatus for supporting a camera, such as a video camera, and accessories, for example, a video monitor in a stable manner.

BACKGROUND ART

Many systems are known in the prior art for supporting cameras and related equipment. Some of these prior art approaches are for the purpose of supporting a camera at a fixed position on a support surface while others are of a portable nature more particularly adapted to provide for support of a camera by a person.

The following patents are believed to be representative of the prior art: U.S. Pat. No., 5,121,147, issued Jun. 9, 1992; U.S. Pat. No. 4,208,028, issued Jun. 17, 1980; U.S. Pat. No. 2,007,215, issued Jul. 9, 1935; U.S. Pat. No. 4,474,439, issued Oct. 2, 1984; U.S. Pat. No. RE. 32,213, dated Jul. 22, 1986; and U.S. Pat. No. 4,946,272, dated Aug. 7, 1990.

While some of the above-identified patents disclose arrangements having the objective of stabilizing a video camera, a motion picture camera or other type of camera supported by an individual, prior art approaches are generally characterized by their relative complexity and relatively high expense, as well as by their bulky, cumbersome nature. Furthermore, some of the arrangements do not lend themselves for use with equipment other than the camera per se. Many prior art arrangements are not particularly useful or appropriate when using lightweight video cameras, such as those commonly employed by amateurs, which are particularly prone to inadvertent movement by the user.

DISCLOSURE OF INVENTION

The present invention relates to apparatus providing a stable support for video cameras and other types of cameras carried by a person. The apparatus is relatively inexpensive and of relatively simple construction as compared to prior art devices. However, the apparatus provides a high degree of stability for a video camera or the like carried by an individual comparable to more expensive and complex arrangements. Furthermore, the apparatus of the present invention provides support for conventional accessories commonly used with or in connection with a camera, examples being video monitors, lights and microphones. The user of the apparatus can readily connect it to his or her body or remove it therefrom.

The apparatus of the present invention is for supporting a camera, such as a video camera. The apparatus includes an elongated support member defining an elongated hollow interior for receiving and having substantially positioned therein the forearm of a person using the apparatus.

A stabilizing member is connected to the elongated support member and extendable outwardly from the elongated support member. The stabilizing member is for positioning about the neck of a person using the apparatus to exert a stabilizing force on the elongated support member when the forearm of a person using the apparatus is substantially positioned within the elongated hollow interior of the elongated member.

Camera mounting means is connected to the elongated support member for mounting a camera on the elongated support member.

Accessory mounting means is connected to the elongated support member spaced from the camera mounting means.

A manually graspable handle is affixed to the elongated support member and extends into the elongated hollow interior, the manually graspable handle for grasping by the hand of a person using the apparatus to restrict relative movement between the elongated support member and the person's forearm positioned in the elongated hollow interior.

Other features, advantages, and objects of the present invention will become apparent with reference to the following description and accompanying drawings.

BRIEF DESCRIPTION OF DRAWINGS

FIG. 1 is a frontal, perspective view illustrating apparatus constructed in accordance with the teachings of the present invention in position on a person's body and supporting a video camera, video monitor and other accessories;

FIG. 2 is an enlarged, side view of the apparatus positioned on a support surface;

FIG. 3 is a side view of the apparatus and illustrating a portion of a human hand grasping an interior handle of the apparatus;

FIG. 4 is an enlarged, cross-sectional view taken along the line 4—4 of FIG. 2;

FIG. 5 is an enlarged, exploded, perspective view of mounting means of the apparatus;

FIG. 6 is a side view of an alternate embodiment of the invention;

FIG. 7 is a top view of the alternate embodiment; and

FIG. 8 is an enlarged, end view of the alternate embodiment.

MODES FOR CARRYING OUT THE INVENTION

Referring now to FIGS. 1–4, apparatus constructed in accordance with the teachings of the present invention is designated by reference numeral 10. In FIG. 1, apparatus 10 is supported by an individual. In FIGS. 2 and 3, the apparatus 10 is shown resting on a support surface 12. In either position apparatus 10 functions to support a video camera and any associated equipment in a highly stable manner.

Apparatus 10 includes an elongated support member 16. Elongated support member 16 may be constructed of any suitable material such as metal or plastic. It is rigid and, in the embodiment illustrated, has a tube-like configuration. Member 16 has a circular wall 18 defining a hollow interior 20.

As may be seen with particular reference to FIG. 1, the hollow interior is for receiving the forearm of a person carrying and utilizing the apparatus, the forearm being inserted into an opening 22 at one end of the member 16 which communicates with the elongated hollow interior 20. In the arrangement illustrated, the end of the member 16 defining the opening 22 is slanted or bevelled to facilitate entry of the user's arm into the hollow interior.

The opposed end of the member 16 is also open in the illustrated embodiment of FIGS. 1–4. The distance between the opposed ends of the member 16 is such as to allow a significant portion of the user's forearm to be accommodated therein along with the user's hand.

A stabilizing member in the form of a flexible strap 26 is disposed about the user's neck. The free ends of the strap 26 are connected by any suitable clips or other connectors (not shown) to an eyelet 28 bolted or otherwise secured to member 16 (see FIG. 3).

To stabilize member 16 relative to the user's body, the user takes up the slack in strap 26 so that the strap is taut between his or her neck and the member 16. Of course, gravity will accomplish this to some extent; however, the user, by exerting a downward force on his or her forearm inserted in the member 16, will increase the tension.

The stability of the apparatus relative to the user's body is further promoted by the fact that means is provided to resist relative movement between the forearm and member 16. More particularly, a manually graspable handle 30 is disposed in the interior 20 closely adjacent to the end of the member 16 removed from opening 22.

In the arrangement illustrated, handle 30 is in the form of a tube which extends through wall 18 and has caps 32, 34 threadably secured thereto. As shown in FIG. 3, the user wraps his or her fingers about handle 30 to maintain a steady and rigid interconnection between member 16 and the user. The forearm and wrist are essentially locked in place. A port 36 (FIG. 3) may be provided to allow the user's thumb to project outwardly from member 16.

Positioned between cap 34 and wall 18 is a plate 40 which has two down-turned ends 42, 44 comprising leg members. Plate 40 is rotatable about handle 30 (as illustrated in FIG. 2) unless otherwise locked into position or restrained from doing so. Selective locking against movement of plate 40 is accomplished by tightening cap 34 so that it bears against the underside of plate 40. This in turn causes a boss 50 on plate 40 to engage and tighten against a washer 52 also disposed about manually graspable member 30.

When the leg members 42, 44 are oriented as shown in solid lines in FIGS. 2-4, a tripod is formed, allowing apparatus 10 to be maintained in highly stable condition when resting on a support surface 12. The third leg of the tripod is, of course, the extreme lower end of the wall 18 at opening 22.

In FIG. 1 apparatus 10 is illustrated as supporting a video camera 60, a video monitor 62, a light 64 and a microphone 66. Devices 60, 62, 64 and 66 may be of any suitable conventional type and do not, per se, constitute the present invention. The camera 60 and the accessories, 62, 64 and 66 may be mounted on wall 18 of elongated support member 16 by any suitable mounts or connectors. The camera and the accessories are mounted at selected spaced locations on and along the elongated support member 16.

FIGS. 2 and 4, for example, show a male connector 70 and a female connector 72. Of course, connectors 70, 72 are of the general types commonly employed to mount video cameras and related equipment and accessories. The precise positions illustrated for these connectors are representative only.

In the illustrated form of the apparatus 10, a threaded shaft 74 with a knob 76 extends through holes in caps 32, 34 and handle 30. The threaded upper end of the shaft may be employed as the means for mounting a camera, such as a video camera, in position by being screwed into the threaded mounting socket conventionally provided for such purpose.

FIG. 5 discloses a clamp 80 which may be secured in place to hold a video monitor or other desired accessory. Clamp 80 has a U-shaped member 82 to be fixed to wall 18 and a movable plate element 84 for movement within the confines of U-shaped member 82. A set screw 86 is utilized to effect clamping action, the lower key element 88 of plate element 84 being accommodated for slidable movement within a slot 90. Padding may be utilized as shown to prevent scratching or marring of the video monitor or other accessory or piece of equipment clamped in position.

In the arrangement illustrated in FIGS. 1-4, a second handle 94 is provided to allow the user to use his or her free hand to further contribute to guiding movement of the apparatus 10 and the camera 60 in a highly stable manner.

FIGS. 6-8 show an alternate embodiment wherein the apparatus 10A includes an elongated support member 16A including a polygonal-shaped rigid outer shell 100 of plastic or the like having a resilient inner layer 102 of plastic foam or the like for accommodating a user's arm. Attached to the outer periphery of outer shell 100 are standard universal mounts 104 for connection to a camera, monitor or accessories. A flat plate 106 is connected to the bottom to support the device on a support surface when it is not being carried by a stabilizing strap positioned around a user's neck as previously described with the FIGS. 1-4 embodiment. In the interest of simplicity, the strap and its means of interconnection to support member 16A have not been illustrated. A hole 108 is formed in shell 100 and layer 102 to accommodate a portion of a user's hand, e.g. the thumb, so that the elongated support member 16A itself may be utilized as a handle by the user.

I claim:

1. Apparatus for supporting a camera, said apparatus comprising, in combination:
    an elongated support member defining an elongated hollow interior for receiving and having substantially positioned therein the forearm of a person using the apparatus;
    a stabilizing member connected to said elongated support member and extendable outwardly from said elongated support member, said stabilizing member for positioning about the neck of a person using the apparatus to exert a stabilizing force on the elongated support member when the forearm of said person is substantially positioned within the elongated hollow interior of said elongated support member; and
    camera mounting means connected to said elongated support member for mounting a camera on said elongated support member.

2. The apparatus according to claim 1 additionally comprising accessory mounting means connected to said elongated support member spaced from said camera mounting means.

3. The apparatus according to claim 2 wherein said camera is a video camera and wherein said accessory mounting means is for mounting a monitor adjacent to a video camera mounted on said camera mounting means.

4. The apparatus according to claim 1 additionally comprising a manually graspable handle affixed to said elongated support member and extending into said elongated hollow interior, said manually graspable handle for grasping by the hand of a person using the apparatus to restrict relative movement between the elongated support member and the person's forearm substantially positioned in said elongated hollow interior.

5. The apparatus according to claim 1 wherein said elongated support member has two opposed ends, at least one of said opposed ends defining an opening communicating with said elongated hollow interior and for receiving the forearm of a person using the apparatus, said apparatus including handle means external of said elongated support member and adjacent one of said opposed ends.

6. The apparatus according to claim 1 wherein said elongated support member has an elongated support member wall extending substantially about said elongated hollow interior and defining said elongated hollow interior.

7. The apparatus according to claim 6 wherein said elongated support member wall is rigid and has a generally tube-like configuration.

8. The apparatus according to claim 1 wherein said stabilizing member comprises a strap positionable about the neck of a person using the apparatus, said strap having at least one strap end connected to said elongated support member.

9. The apparatus according to claim 1 wherein said elongated support member has opposed ends, said apparatus additionally comprising leg means connected to said elongated support member and including a plurality of leg members extending downwardly from said elongated support member.

10. The apparatus according to claim 9 wherein said leg members are closer to one of said elongated support member opposed ends than to the other of said elongated support member opposed ends.

11. The apparatus according to claim 9 wherein said leg means is adjustably connected to said elongated support member.

12. The apparatus according to claim 2 wherein said accessory mounting means comprises a plurality of accessory mounts connected to said elongated support member for supporting a plurality of accessories at spaced locations on said elongated support member.

13. The apparatus according to claim 5 wherein one of said opposed ends is bevelled.

14. In combination:
a video camera;
a video monitor; and
apparatus supporting both said video camera and said video monitor, said apparatus including a hollow, elongated support member for receiving and having substantially positioned therein the forearm of a person using the apparatus, a stabilizing member connected to said hollow, elongated support member and extendable outwardly from the hollow, elongated support member, said stabilizing member for positioning about the neck of a person using the apparatus to exert a stabilizing force on the hollow, elongated support member when the forearm of said person is substantially positioned within the hollow, elongated support member;
video camera mounting means on said hollow, elongated support member connecting said video camera to said hollow, elongated support member at a first location on said hollow, elongated support member; and
video monitor mounting means on said hollow, elongated support member connecting said video monitor to said hollow, elongated support member at a second location on said hollow, elongated support member spaced from said first location.

15. The combination according to claim 14 wherein said hollow, elongated support member has a general tube-like configuration and has opposed ends.

16. The combination according to claim 15 wherein said video camera and said video monitor are selectively adjustably mounted on said hollow, elongated support member.

17. The combination according to claim 14 additionally comprising a first handle attached to and within said hollow, elongated support member and a second handle attached to and disposed outside said hollow, elongated support member.

18. Apparatus for supporting both a video camera and a video monitor, said apparatus including:
a hollow, elongated support member for receiving and having substantially positioned therein the forearm of a person using the apparatus;
video camera mounting means on said hollow, elongated support member for connecting a video camera to said hollow, elongated support member at a first location on said hollow, elongated support member; and
video monitor mounting means on said hollow, elongated support member for connecting a video monitor to said hollow, elongated support member at a second location on said hollow, elongated support member spaced from said first location.

* * * * *